United States Patent
Wadsworth

(10) Patent No.: US 11,633,927 B2
(45) Date of Patent: Apr. 25, 2023

(54) SYSTEM AND APPARATUS FOR MANUFACTURING SIMPLE CURVATURE THERMOPLASTIC COMPOSITE PARTS

(71) Applicant: Spirit AeroSystems, Inc., Wichita, KS (US)

(72) Inventor: Mark Anthony Wadsworth, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 287 days.

(21) Appl. No.: 16/883,518

(22) Filed: May 26, 2020

(65) Prior Publication Data
US 2021/0370621 A1 Dec. 2, 2021

(51) Int. Cl.
*B29C 70/38* (2006.01)
*B29C 33/02* (2006.01)
*B29C 70/44* (2006.01)
*B29C 70/54* (2006.01)
*B29K 101/12* (2006.01)

(52) U.S. Cl.
CPC .......... *B29C 70/386* (2013.01); *B29C 70/443* (2013.01); *B29C 70/543* (2013.01); *B29K 2101/12* (2013.01); *B29K 2905/12* (2013.01)

(58) Field of Classification Search
CPC ... B29C 70/386; B29C 70/543; B29C 70/549; B29C 70/44
See application file for complete search history.

(56) References Cited

U.S. PATENT DOCUMENTS

| | | | | |
|---|---|---|---|---|
| 5,064,597 A | * | 11/1991 | Kim | B29C 43/52 264/DIG. 65 |
| 6,391,246 B2 | * | 5/2002 | Shiraishi | B29C 70/342 156/289 |
| 9,511,548 B1 | | 12/2016 | Rotter et al. | |
| 2011/0143100 A1 | * | 6/2011 | Levers | B29C 70/544 156/382 |
| 2013/0099089 A1 | * | 4/2013 | Chang | B29C 33/38 249/78 |

OTHER PUBLICATIONS

U.S. Appl. No. 16/404,794, filed May 7, 2019, Wadsworth.

* cited by examiner

*Primary Examiner* — Matthew J Daniels
(74) *Attorney, Agent, or Firm* — Hovey Williams LLP

(57) ABSTRACT

A system for manufacturing a composite part including a conductive flexible facesheet and an automated tape layup (ATL) machine for laying up composite tape onto the facesheet that is laid flat on a flat surface. The system also includes a curved tooling surface for transferring the facesheet with the composite material thereon to the curved tooling surface for attachment of substructures and curing into the composite part. System may also include insulation placed below the facesheet and insulation placed above the composite material, as well as a source of electricity and heat for heating the conductive facesheet to cure, melt, or fuse the composite tape and substructures without heating the tooling surface and other tooling used in the composite curing process. Heating of the facesheet may be performed using joule heat provided by a single turn transformer inducing current to conductive wires attached at opposing ends to the facesheet.

15 Claims, 5 Drawing Sheets

SYSTEM AND APPARATUS FOR MANUFACTURING SIMPLE CURVATURE THERMOPLASTIC COMPOSITE PARTS

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

Embodiments of the present invention relate to methods and systems for manufacturing composite parts on a curved tooling surface.

BACKGROUND

The manufacture of structural aircraft members from layers of thermoplastic composite materials, fiber-reinforced or otherwise, is accomplished using a number of techniques, each having advantages and disadvantages. Most composite aircraft structures made of unidirectional tape are made using automated fiber placement (AFP) processes in which individual layers (plies) of uncured or unfused composite pre-impregnated unidirectional tape are placed on contoured tooling. An AFP machine typically makes multiple passes or courses over the tooling to complete the placement of each layer. Each course may be approximately eight inches wide and may consist of multiple narrow strips of tape to better accommodate the tooling's contours. The individual strips making up a course must be narrow because the path of the tape is not always the same length across the width of the coverage of a given course. The narrow width of the individual strips of tape applied by AFP equipment provides a high degree of flexibility that enables AFP layup processes to be applied to most gentle compound curves.

However, programming and manipulating an AFP head to follow contours reduces the speed that an AFP machine can move. Furthermore, the narrow strips of material required for AFP processes are expensive because each strip must be separately slit, inspected, and packaged. Additionally, AFP machines are often mechanically complex and costly because they must be designed to feed and apply up to 16 separate strips of material simultaneously. Therefore, automated tape laying (ATL) processes are typically used for large, flat parts rather than AFP processes. With ATL, courses of full width tape are applied rather than courses composed of multiple narrow strips. An ATL course may also be wider than an AFP course. Thus, ATL is more efficient than AFP, since the tape's wider width allows the tape-laying machine to cover the same tooling area in fewer passes. ATL also uses less expensive materials than AFP. However, ATL tape cannot be applied using differential speeds from one side of a course to the other, and rollers of ATL machines are typically wider, more solid than, and generally not as compliant as rollers for AFP machines. Due to these limitations, ATL is generally not compatible with curved contours and is largely relegated for use in making flat or nearly flat composite components. There are many parts having only a simple curvature where the level of flexibility provided by AFP is unnecessary, and where AFP is more costly and inefficient than desired, but where traditional ATL processes are not compatible with the curvature of the part mold or tooling.

Another problem in the manufacturing of composite parts, particularly those with some type of curvature, occurs due to thermal expansion. Specifically, once tape laying or composite fiber placement is complete, the composite tape is cured (thermoset) or fused (thermoplastic). This curing or fusing process may involve the composite tape layers being compressed via vacuum and autoclave pressure and heated past their melting or curing point, consolidating the layers of composite tape together. Once the pressure and heat are removed, the consolidated composite material becomes a hardened composite part having the shape of the mold or tooling on which it was cured or fused. However, the mold or tooling on which the composite part is cured or fused generally experiences some thermal expansion during curing or fusing of the composite part. Thus, in order to ensure that the thermal expansion does not result in an incorrectly sized composite part, the mold or tooling must be carefully sized with this thermal expansion factored in. Even small sizing errors or changes in an amount of heat applied may result in an incorrectly sized composite part. Furthermore, incorrect sizing can in some situations even lead to the mold or tooling breaking the composite part if both cool and shrink at different rates, particularly for curved composite parts. Note that heating an entire oven or autoclave, as well as heating the mold or tooling and the composite part also requires a large amount of power.

Yet another difficulty in composite part manufacture, particularly for aircraft structures, is combining composite parts together after they are individually cured or fused. For example, a composite component referred to as "skin" is often joined together with substructures such as frames and stringers serving as an internal frame for the composite part. This may be done by means of fasteners, but it generally more desirable to integrate the parts as a single monolithic structure. Co-curing, co-molding or fusing of the skin with the substructures is one method of joining these components without adding holes and fasteners which can increase the overall weight and cost of the aircraft structure. In co-curing, co-molding, or fusing together of two composite components, the substructures may be placed against the skin and the combination may be placed in an oven or autoclave for application of heat and fusing of the substructure to the skin. Traditional approaches for co-curing, co-molding, or fusing composite components in this manner may include multiple complex tooling or mold components to provide sufficient pressure for maintaining the shape and consolidation of the previously-formed composite components as they are cured together or re-melted to fuse them. Thus, such co-curing or fusing lay-up techniques can be complicated and time-consuming.

SUMMARY

This Summary is provided to introduce a selection of concepts in a simplified form that are further described below in the Detailed Description. This Summary is not intended to identify key features or essential elements of the claimed subject matter, nor is it intended to be used as an aid in determining the scope of the claimed subject matter. The present invention is defined by the claims.

At a high level, aspects herein relate to systems for laying layers of composite material, also referred to as composite tape, onto a conductive facesheet on a flat surface and then transferring the facesheet and composite material onto a curved tooling surface for cure, melting, or fusing thereon by heating the facesheet. This may be accomplished with a system for manufacturing a thermoplastic composite part, the system including a facesheet, a tooling surface made of or having a first insulating material placed thereon, a second insulating material, and a source of heat or electricity. Specifically, the facesheet may be made of a flexible or formable conductive material for placement of the thermoplastic composite part thereon. The tooling surface may be made of insulating material or may include a first insulating material positioned onto the tooling surface. Furthermore, the facesheet is positioned on the tooling surface and/or the first insulating material. In some embodiments, at least a portion of the tooling surface is not flat and/or forms a simple curvature for curing the composite part into a curved shape. The second insulating material is sized and configured for placement over the thermoplastic composite part prior to cure, melting, or fusing thereof. The source of heat or electricity is physically and/or electrically coupled to the facesheet and is configured to generate sufficient heat to cure the thermoplastic composite part.

In some embodiments, the system may also include an automated tape layup (ATL) machine for laying strips of composite material onto the facesheet on a flat surface prior to insertion of the facesheet onto the tooling surface. Furthermore, the system may further include an impermeable membrane sized and configured to be placed over the second insulating material and the thermoplastic composite part after it is placed from the flat surface to the tooling surface. Specifically, the impermeable membrane may be sealed to the tooling surface and may apply consolidation pressure to the thermoplastic composite part when a pressure differential is applied to the impermeable membrane, forcing the impermeable membrane toward the tooling surface. Furthermore, the source of heat or electricity may be a source of joule heat and may include at least two conductive bus bars attached to opposing ends of the facesheet and one or more conductive wires providing current to heat the facesheet.

This summary is provided to introduce a selection of concepts in a simplified form that are further described below in the Detailed Description. This summary is not intended to identify key features or essential features of the claimed subject matter, nor is it intended to be used to limit the scope of the claimed subject matter. Other aspects and advantages of the present invention will be apparent from the following Detailed Description and the accompanying drawing figures.

BRIEF DESCRIPTION OF THE DRAWINGS

Examples are described in detail below with reference to the attached drawing figures, wherein:

FIG. 5b is a front elevation view of a single turn transformer of FIG. 5a;

Figure 1:
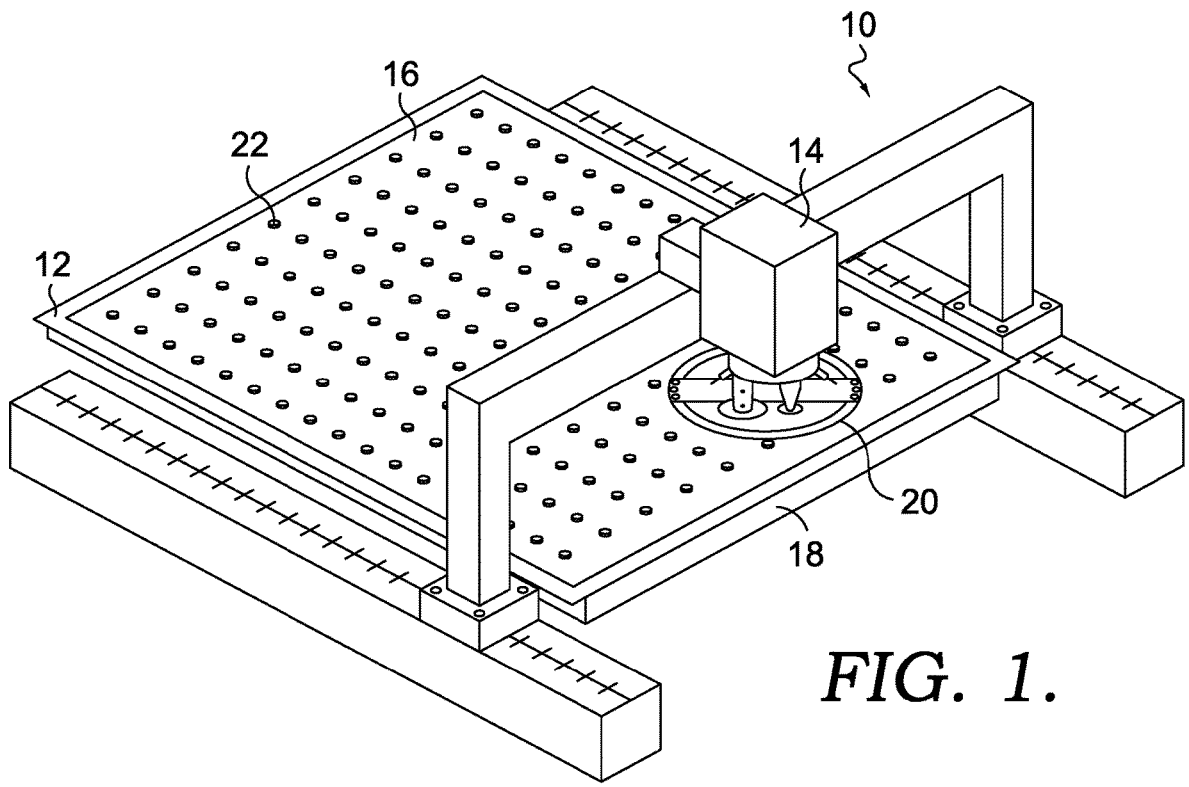
FIG. 1 is a perspective view of an automated tape layup (ATL) machine laying composite tape onto a flat surface to form a composite skin in accordance with embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the technology herein can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Figure 2:
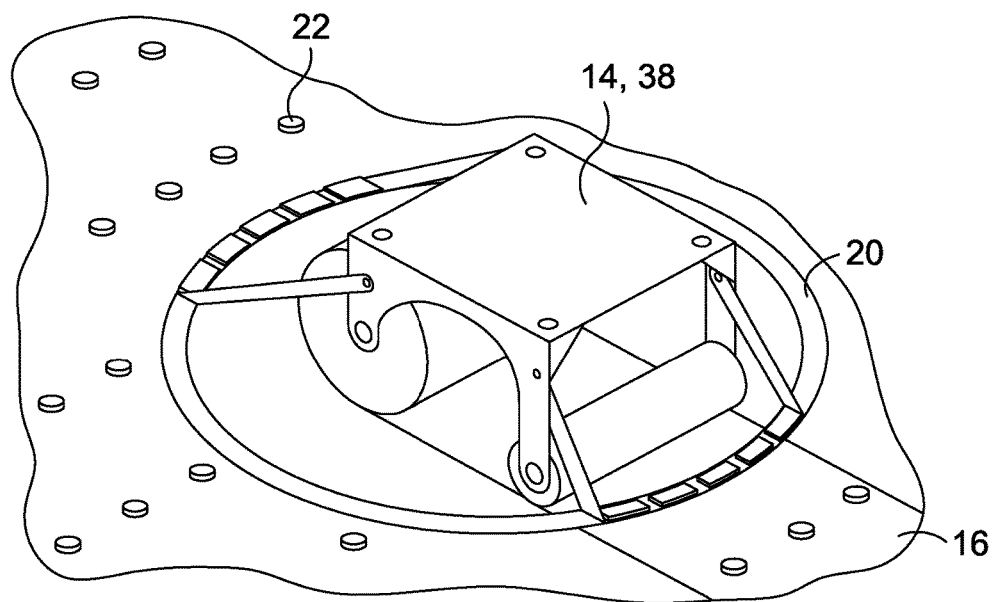
FIG. 2 is a perspective view of a portion of the ATL machine with a magnet placement apparatus attached therein in accordance with an embodiment of the present invention.
Figure 3:
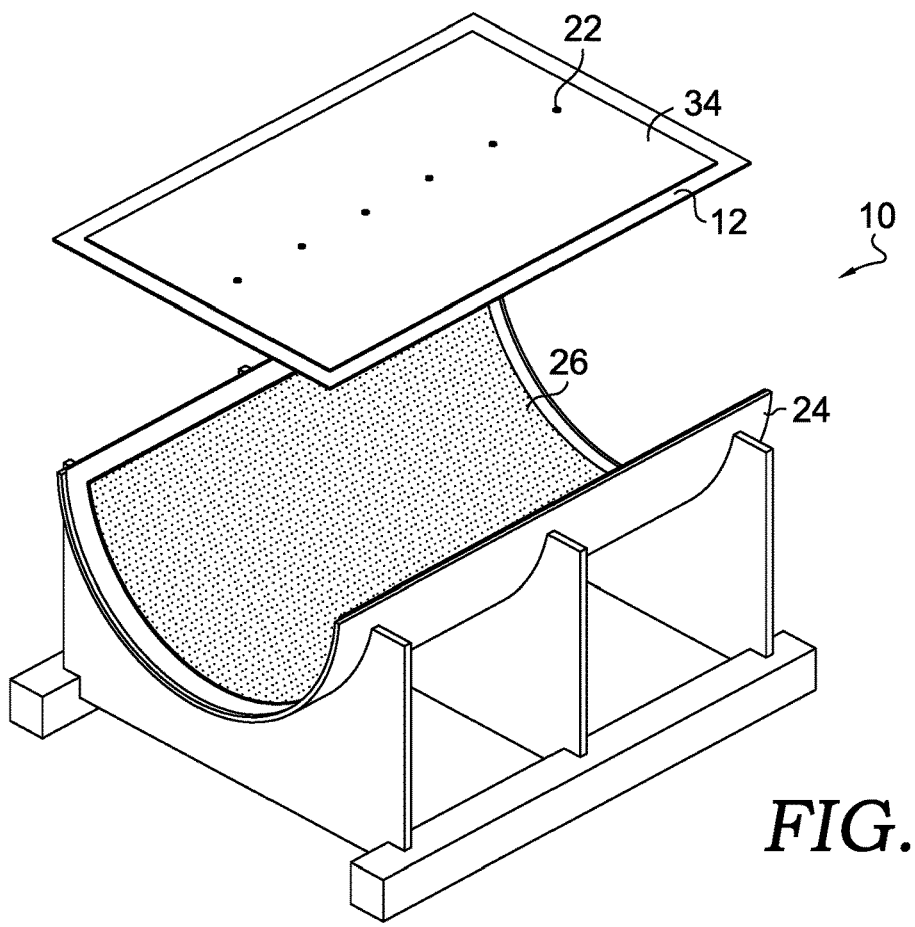
FIG. 3 is a perspective view of a curved tooling surface with a first insulating material laid thereon in accordance with an embodiment of the present invention.
Figure 4:
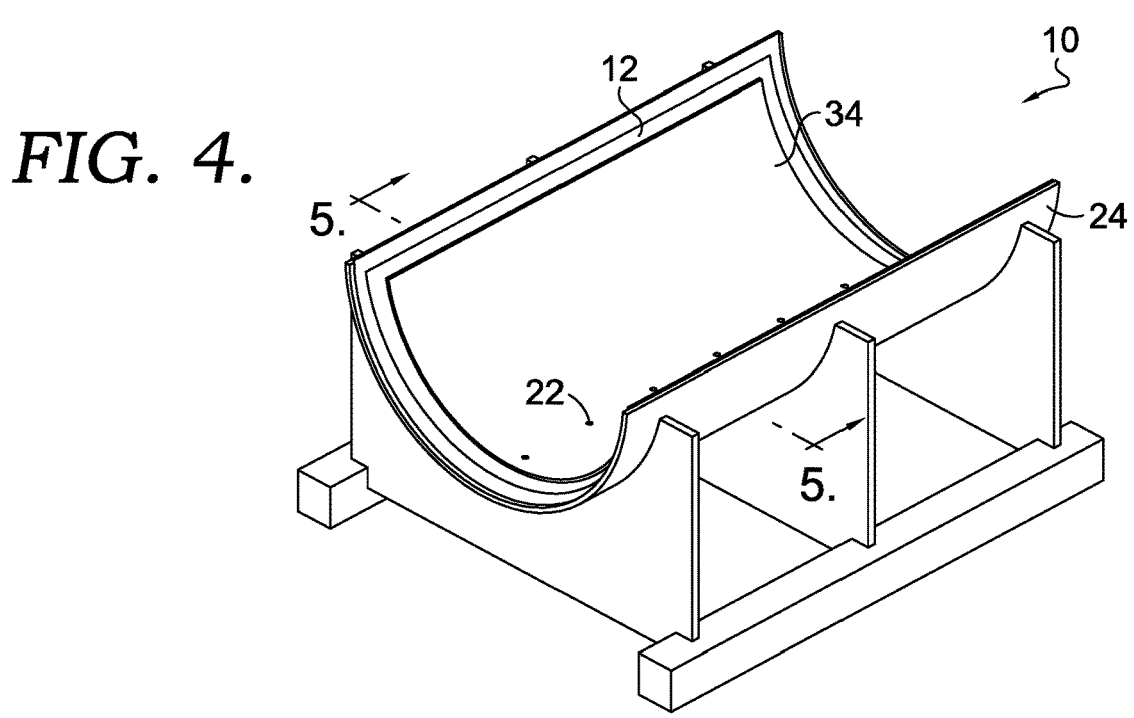
FIG. 4 is a perspective view of the tooling surface of FIG. 3 with the composite skin of FIG. 1 being placed thereon.
Figure 5A:
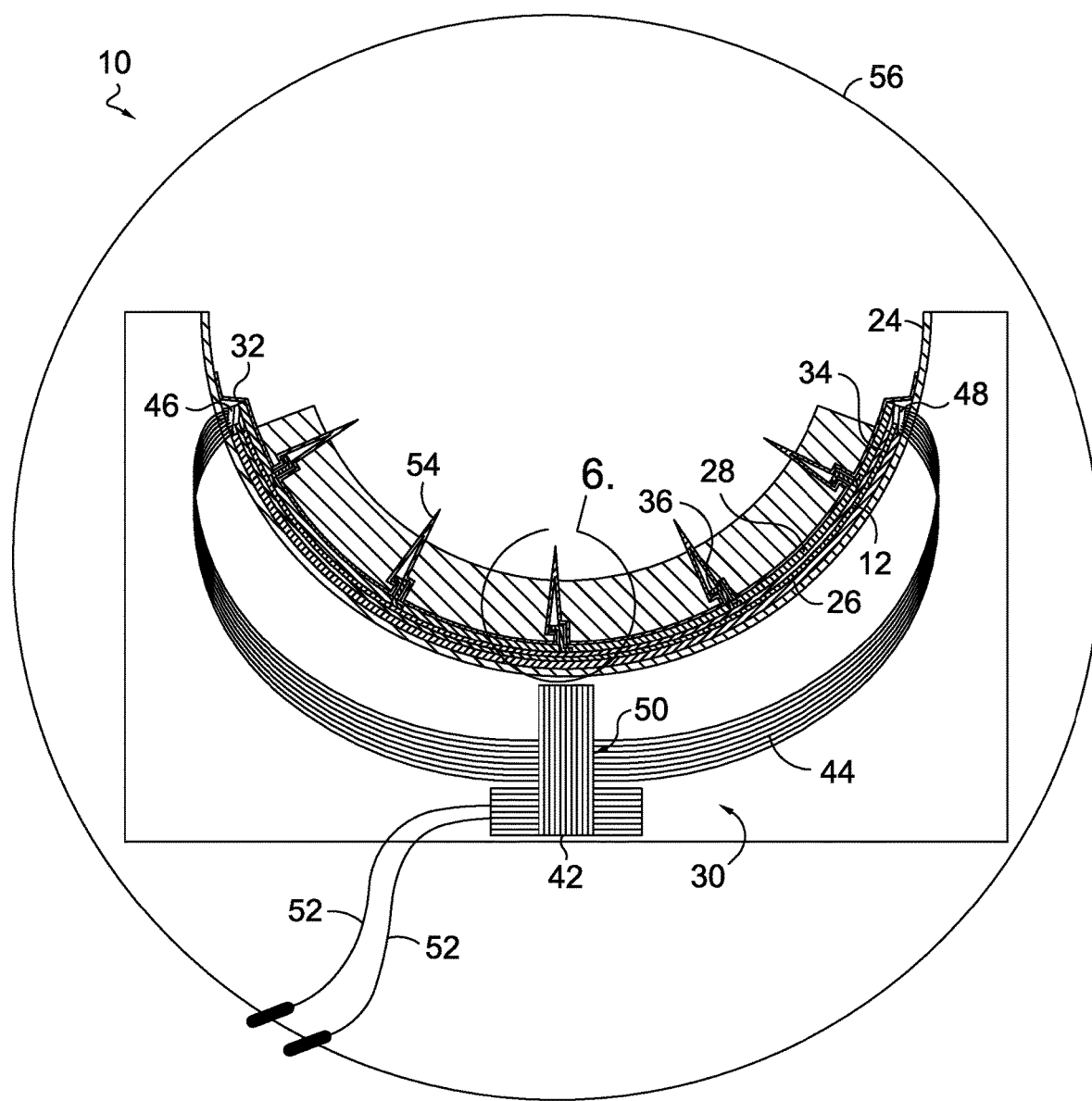
FIG. 5a is a side elevation cross-sectional view of the tooling surface of FIG. 4 taken along line 5-5 in FIG. 4, further depicting the first insulating material, the facesheet, the composite skin, substructures, a second insulating material, and an impermeable membrane layered thereon for curing in an autoclave in accordance with embodiments of the present invention.
Figure 5B:
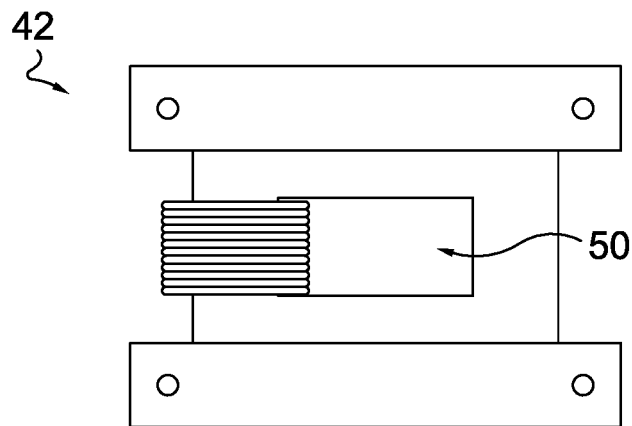
Figure 6:
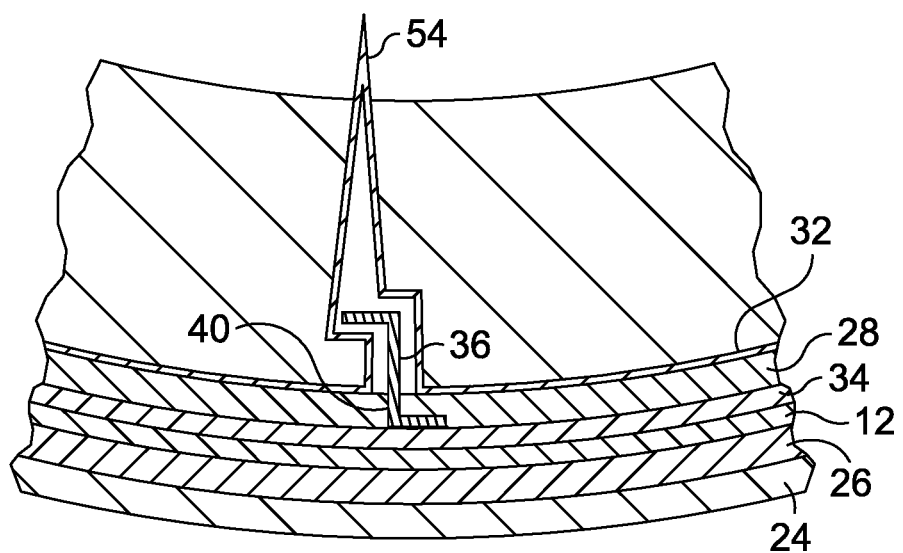
FIG. 6 is a fragmentary side elevation view depicting a close-up of layers of materials depicted in FIG. 5.

As depicted in FIGS. 1-6, aspects herein relate to a system 10 and method of forming a thermoplastic composite part. In some aspects, as depicted in FIGS. 1-2, the system 10 comprises a facesheet 12 and an automated tape layup (ATL) machine 14 for laying courses of composite material, referred to herein as composite tape 16, onto a flat surface 18. The system 10 may also include a magnet placement apparatus 20 for dispensing and collecting magnets 22 for holding down the composite tape 16 during various stages of ATL on the flat surface 18. Furthermore, the system 10 may comprise a tooling surface 24, a first insulating material 26, a second insulating material 28, and a source of heat or electricity 30. In some embodiments, the system 10, as depicted in FIGS. 5a and 6, may include an impermeable membrane 32 for placement over the second insulating material 28 and the thermoplastic composite part for providing compressive force to the composite tape 16 and/or other portions of the composite part during curing thereof.

The composite part being manufactured by the system 10 and method herein may be made from thermoset or thermoplastic composite material and may include a composite skin 34 co-cured or fused to at least one composite substructure 36, as depicted in FIGS. 5a and 6. Specifically, the composite skin 34 may be for aircraft components such as a fuselage or engine nacelle, and the substructure 36 fused thereto may be one or more frames and/or stringers providing structural reinforcement to the composite skin 34. The composite skin 34 can be formed using a plurality of layers of composite plies and/or composite tape 16. The composite tape 16 or plies may be made of carbon-fiber reinforced epoxy and may specifically be a prepregged unidirectional tape or continuous strip of fabric. For example, composite tape 16 used for ATL methods described herein may be approximately twelve inches in width and may be of a form approximately 40% less expensive than an equivalent amount of eight-inch tape widths (e.g., slit tape) traditionally used for automated fiber placement (AFP) methods. The substructure 16 may include frames, stringers, or other composite part structures for being fused or otherwise integrated with another composite part or composite skin 34.

The facesheet 12 may be made of a thin, flexible conductive material having high resistivity such as steel (e.g., 304 Stainless Steel, A36 Steel, or the like). Note that although the steel itself may be substantially rigid, the facesheet may be thin enough that the steel may flex sufficiently for conforming to simple curvatures, as later described herein. However other conductive materials may be used without departing from the scope of the technology described herein. In some embodiments, facesheet 12 may have a thickness sufficient to support the composite tape 16 thereon, such as a thickness in a range of 0.01 inches to 0.1 inches. For example, the thickness may be approximately 0.032 inches for providing an optimum flexibility and sufficient resistance to enable four or more volts of potential.

The ATL machine 14 is configured for laying courses of composite material (e.g., composite tape 16) onto the facesheet 12 on the flat surface 18 prior to insertion of the facesheet 12 onto the tooling surface 24, as later described herein. For example, the ATL machine 14 may include a robotically controlled head 38, as depicted in FIG. 2, including a spool or spools of composite tape, a winder, winder guides, a compaction shoe, a position sensor, and/or a tape cutter or slitter. However, other ATL machine configurations known in the art may be used for ATL composite tape layup without departing from the scope of the technology described herein. The ATL machine 14 lays down the composite tape 16 at various desired path orientations which may vary between different layers of the composite skin 34. To hold the courses of composite material down in their desired orientations prior to curing or fusing, various types of welding or tacking are traditionally used (e.g., heating and adhering each strip to previously deposited layers as it is applied) but may not be preferred in some embodiments of the invention described herein because such traditional means of tacking may render a stack of composite layers unable to conform along with the facesheet 12 without wrinkling when it is transferred from the flat surface 18 to the tooling surface 24 as described below. Thus, strategically placed localized tacking and/or removable magnets 22 are described herein to replace such traditional welding or tacking methods for ATL. In some embodiments, each layer of composite material may be adhered to the previously applied layer in only certain locations (e.g., at locations along a center line in a direction of bend for the composite skin 34). If some layers of composite material do not cover the entire area of the facesheet 12 (e.g., doubler plies), such layers may be tacked at a centerline in a direction of bend of such layer which centerline may not coincide with the centerline of the overall composite skin 34. The locations at which each layer of composite material is adhered to the underlying layer may be determined strategically to minimize wrinkling when the facesheet 12 is transferred from the flat surface 18 to the tooling surface 24 as described below. The layers may be adhered at strategic locations by welding (e.g., ultrasonic welding, conduction welding, etc.) or by selective heating of courses of composite material during initial application to cause adhesion at only certain locations. Alternatively, in some embodiments, the layers may be tacked, adhered, or held together over substantially the entire area of the skin 34, but in a manner that allows some inter-layer movement to occur during the transfer of the facesheet 12 from the flat surface 18 to the tooling surface 24 as described below. For example, each layer may be welded to the underlying layer at locations so small that the resin joining the two layers can shear if relative movement is required between layers. Alternatively, magnets may be used to compress the layers together and create friction therebetween, thus holding the layers in position while allowing them to slide if required during the transfer of the facesheet 12 from the flat surface 18 to the tooling surface 24 as described below.

Specifically, the magnetic placement apparatus 20 is a device operable to lay down and pick up magnets 22 by effectuating a change in polarity of portions of the magnetic placement apparatus 20. The magnets 22 may be rare earth magnets such as neodymium magnets attracted to the facesheet 12. For example, the magnet placement apparatus 20 may be configured to place the magnets 22 onto a first layer of courses of composite material during layup by the ATL machine 24 and to pick up magnets 22 from the courses of composite material prior to the ATL machine 14 placing a second layer of courses of composite material (e.g., composite tape 16). In some embodiments, the magnets 22 are just applied at a center line in a direction of bend for the composite skin 34, as depicted in FIG. 4. Furthermore, in some embodiments, the magnet placement apparatus 20 may be a rotatable steel ring around a tape-laying head of the ATL machine 14, as depicted in FIGS. 1-2, and the ring may rotate to move the magnets 22 from in front of the ATL machine tape-laying head to behind the tape-laying head where the magnets 22 are then replaced on a latest or last layer of the composite tape 16.

In some embodiments, the tooling surface 24 is made of insulating material or alternatively the first insulating material 26 is positioned onto the tooling surface 24, as depicted in FIG. 4. At least a portion of the tooling surface 24 is not flat. For example, the tooling surface 24 may have a simple curvature for forming a curved composite part such as an outer mold line (OML) or outer surface of the skin 34 for aircraft components such as a fuselage or engine nacelle. Additionally or alternatively, the tooling surface 24 may have other curvatures. The tooling surface 24 may be formed from any material without departing from the scope of the technology described herein. In some embodiments, any structural frame or base may support the tooling surface in a desired curvature.

The size and shape of the tooling surface 24 may correspond with the composite part to be formed thereon. For example, the composite part may be formed on the tooling surface 24 to have three-dimensional characteristics such as height, depth, curvature, contours, features that intersect at angles up to and including ninety degrees, or features that include a space between them. In some embodiments, the size of the tooling surface 24 may be slightly larger than the composite part to be formed thereon in order to account for a thickness of the facesheet 12 and the first insulating material 26. Furthermore, the size of the tooling surface 24 may also take into account an amount of compression of the first insulating material 26 while under vacuum and autoclave pressure to be applied while curing the composite part.

The first insulating material 26 and the second insulating material 28 may be non-conductive material configured for shielding the tooling surface 24 and/or shielding the impermeable material 32 from heat during curing of the composite part. In some embodiments, the first insulating material 26 and/or the second insulating material 28 may have low thermal conductivity and may be configured to withstand high temperatures. For example, the first insulating material 26 and/or the second insulating material 28 may be made of fiberglass paper, refractory insulation, or other insulating materials. In some embodiments, a substantially rigid insulating material may be used for the first and/or second insulating materials 26,28 and may be configured to resist compressive force during curing of the composite part. For example, refractory insulation may be rigid and may be troweled onto the tooling surface 24 and then NC machined to a final contour for the desired shape of the composite part. However, insulating materials that are compressible may be used without departing from the scope of the technology described herein. In some embodiments, the first and/or second insulating materials 26,28 may be made of a material with low permeability or material that is substantially impermeable in order to prevent heat transfer therethrough. However, other insulating materials may be used without departing from the scope of the invention. The use of vacuum under the impermeable bag may substantially increase the thermal shielding capability of both the first and second insulating materials 26,28.

In some embodiments, the second insulating material 28 may have cuts 40 formed therein, such as using water jet cutting or any cutting methods known in the art. Specifically, the second insulating material 28 can be an insulating sheet cut to allow at least one of the substructures 36 to protrude therethrough, as depicted in FIG. 6. The cuts 40 may be positioned such that the second insulating material 28 serves as a template for locating the substructures 36 at a predetermined location on the skin 34 of the composite part, as later described herein. Additionally or alternatively, the second insulating material 28 may include a plurality of discontinuous insulation panels sized in accordance with desired spacing between respective substructures or other features of the composite part. For example, the discontinuous insulation panels may be laid out in a manner to establish correct positioning of the substructures along the skin 34. Such positioning may be maintained until consolidation is complete and/or until the components of the substructure are fused to the skin 34. The second insulating material 28 may also be engineered, sized, configured, and positioned such that no portion of the impermeable membrane 32 touches a surface that is heated above the melting temperature of the impermeable membrane 32.

The source of heat or electricity 30 may be physically and electrically coupled to the facesheet 12 and may generate sufficient heat to cure, melt, and/or fuse the composite part. Specifically, the source of heat or electricity 30 may be a source of joule heat. For example, a source of joule heat may include a single turn transformer 42, one or more conductive wires 44, and at least two bus bars 46,48. The two bus bars 46,48 may be configured for placement at opposing ends of the facesheet 12 and the conductive wires 44 electrically coupled to the bus bars 46,48 may provide joule heating to the facesheet 12. In some embodiments, the conductive wires 46,48 extend from one of the bus bars 46 to another one of the bus bars 48 and are threaded through an air gap 50 of the single turn transformer 42, as depicted in FIGS. 5a and 5b. The single turn transformer 42 can be connected to an external electrical source by at least one source-coupling wire 52 and can be turned on to induce current into the conductive wires 44. Specifically, the single turn transformer 42 may be configured for transforming high voltage to low voltage and thus high current after penetrating the walls of a pressure vessel. For example, the single turn transformer 42 may be configured to receive 480 VAC from the external electrical source with only 85 amps and then induce a 4.8 VAC at 8500 amps into thirty-two 4/0 copper wires connected to the bus bars 46,48. However, other values and other methods of joule heating or heating of the facesheet 12 may be used without departing from the scope of the technology herein.

The impermeable membrane 32 illustrated in FIGS. 5a and 6 is a flexible material that is substantially or completely impermeable to the atmosphere and/or other gases that may be used for compressive force. For example, the impermeable membrane 32 may be substantially impermeable to atmosphere at a pressure differential of 15 psi or in some embodiments may be impermeable to atmosphere at a pressure differential of up to 100 psi. The impermeable membrane 32 may be a low-temperature bag or plastic that may melt at composite cure, composite melt, and/or composite fusing temperatures but is cheaper and more flexible than higher temperature bags or plastics that are generally stiffer. For example, the impermeable membrane 32 may be made of nylon and have a maximum service temperature in a range of approximately 400 degrees F. and/or a melting point in a range of approximately 428 to 509 degrees F. However, other flexible impermeable membranes may be used without departing from the scope of the invention. Furthermore, the impermeable membrane 32 may include pleats 54 to allow for different features of the composite part, such as substructures 36 like frames or stringers extending outward from the composite skin 34.

The impermeable membrane 32 may be configured for placement over the second insulating material 28 and the composite part, as later described herein. The impermeable membrane 32 may also be configured to be sealed to the tooling surface 24 for applying consolidation pressure to the composite part when a pressure differential is applied across the impermeable membrane 32. The impermeable membrane 32 may be sealed to the tooling surface using sealant tape, mud, or any sealant known in the art. The consolidation pressure may force the impermeable membrane toward the tooling surface 24 under vacuum or autoclave pressure, such as via an autoclave 56 as depicted in FIG. 5a.

Figure 7:
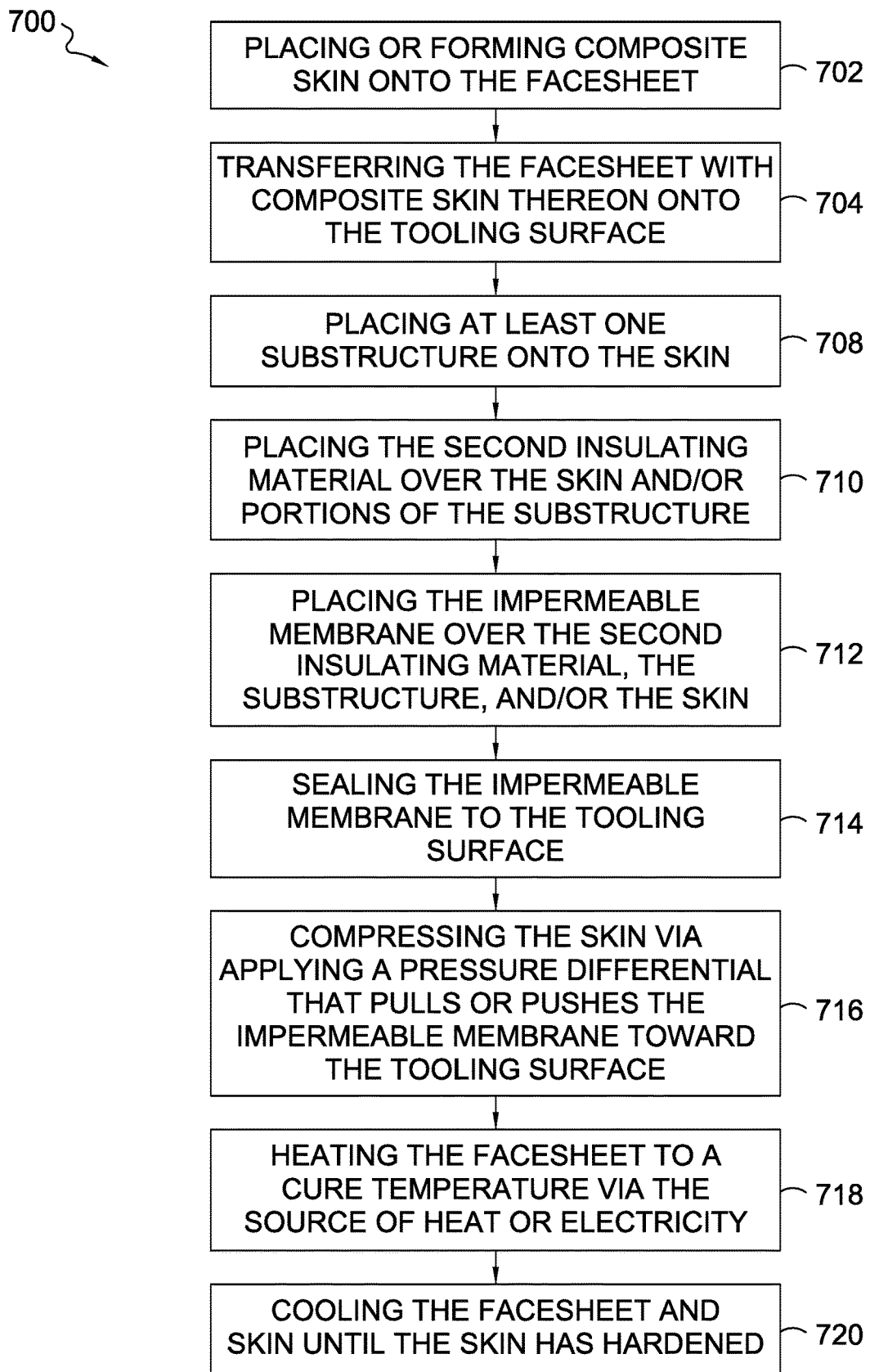
FIG. 7 is an exemplary method of forming and curing a composite part in accordance with embodiments of the present invention.

At least a portion of the steps of a method 700 for manufacturing thermoplastic composite parts using the system 10 in accordance with various embodiments of the present invention is listed in FIG. 7. The steps may be performed in the order as shown in FIG. 7, or they may be performed in a different order. Further, some steps may be performed concurrently as opposed to sequentially. In addition, some steps may be omitted. Still further, embodiments of the present invention may be performed using systems other than system 10 without departing from the scope of the technology described herein.

In some embodiments of the invention, the method 700 may include a step of placing or forming the skin 34 onto the facesheet 12, as depicted in block 702. For example, this step may include using the ATL machine 14 for laying multiple layers of the composite tape 16 (e.g., each formed from courses of composite material) onto the facesheet 12, with the facesheet 12 laying on the substantially flat surface 18. As described above, the facesheet 12 is made of a flexible conductive material. This step may further include tacking welds or applying the magnets 22 onto at least a portion of the plurality of courses of composite tape 16 during ATL, such as down a centerline thereof. For example, permanent tack welds may be applied to the layers of the composite tape 16 via ultrasonic, conduction or other means of melting the composite tape 16 together down the centerline or elsewhere. In some embodiments, such as those using the method 700 for forming half cylindrical parts, a centerline of the part may be the only location where permanent tack welds are applied, allowing for a desired amount of slippage between layers thereof when the composite material is moved from a flat to a curved surface for curing as described herein.

Additionally or alternatively, the magnets 22 are likewise used to temporarily hold the composite tape 16 in place against the facesheet 12, such as between layers of tape layup. This temporary magnetic tacking can be used anywhere on the composite tape 16, including but not limited to the center line thereof. Then, just ahead of the ATL machine 14 the magnets 22 may be removed at a point in time between applications of each layer of the composite tape 16. Specifically, the magnet placement apparatus 20 may deploy and remove the magnets 22 using differential magnetic polarity. For example, the magnet placement apparatus 20 may switch between a first polarity and a second polarity for depositing and picking up the magnets 22 from the composite material.

In some embodiments, as depicted in FIGS. 1 and 2, the magnet placement apparatus 20 may be attached to or work in conjunction with the ATL machine 14 such that a portion of the magnet placement apparatus 20 slightly ahead of the ATL machine's tape-laying head is configured to attract and thus pick up magnets 22 from a previous layer of composite tape 16 while a portion of the magnet placement apparatus 20 slightly behind the ATL machine's tape-laying head is configured to repel and thus deposit magnets 22 onto the freshly laid layer of composite tape 16. Alternatively, as described above, the magnet placement apparatus 20 may be a rotatable steel ring that moves the magnets from in front of the ATL machine's tape-laying head to behind the tape-laying head, where the magnets 22 are replaced on a next layer of the composite tape 16.

Furthermore, after all layers of composite tape 16 are laid via the ATL machine 14, one or more of the magnets 22 may remain on a top layer of the composite tape 16 to help maintain composite tape orientation as the facesheet 12 and composite skin 34 is moved from the flat surface 18 to the tooling surface 24, as later described herein. For example, a center line of magnets 22 may remain during this transfer, such that some slippage of composite tape 16 is allowed as the skin 34 is curved to mate with the tooling surface's curvature, but without allowing the composite tape's orientation to be negatively affected. Thus, use of magnets (or other temporary and permanent tacking methods known in the art) to hold the composite tape 16 in place temporarily prior to cure is advantageous over welding or other permanent tacking methods in areas where some material slippage allows for easier transfer of the composite material from the flat surface 18 to the curved tooling surface 24 without undesirable buckling, puckers, or wrinkles of the composite tape 16.

The method 700 may further include a step of transferring the facesheet 12 with the skin thereon onto the tooling surface 24, as depicted in block 704. Specifically, this step may include transferring the facesheet 12 with the skin 34 thereon from the flat surface 18 to the tooling surface 24, and the tooling surface 24 may be curved such that the facesheet 12 with the skin 34 thereon is curved by the tooling surface 24. This method of laying up composite material in the flat and then transferring it to a curved tooling surface advantageously allows ATL methods of composite layup to be used for a curved composite part, saving time and money over AFP methods traditionally used for curved composite parts.

The transferring step may be performed manually or may be performed by crane, magnetic lifters, and/or spreader bars. However, any transferring method may be used without departing from the scope of the technology described herein. Furthermore, this transferring step may further comprise bending or otherwise conforming the facesheet 12 elastically with edges of the facesheet 12 clamped or otherwise dogged down to the tooling surface 24, buckling the facesheet 12 into the simple contour of the tooling surface 24. Additionally or alternatively, weight of the skin 34 and/or other components placed thereon may press the facesheet 12 against the tooling surface 24. However, in some embodiments, it may not be necessary that the facesheet 12 be completely intimate with the first insulating material 26 at this transferring step since final vacuum bag and pressure differential across the impermeable material will force the facesheet 12 against the first insulation layer in later steps described herein.

As noted above, the tooling surface 24 used in this step 704 may be made of insulating material and/or the first insulating material 26 may be positioned between the tooling surface 24 and the facesheet 12. Specifically, the first insulating material 26 may be placed onto the tooling surface 24 prior to placement of the facesheet 12 thereon. In some embodiments of the invention, in addition to or as an alternative to the magnets 22 described above, a temporary bag (not shown) comprising any impermeable material or vacuum bag may be applied over the composite skin 34, sealed to the facesheet 12, and vacuumed toward the facesheet 12 to hold the composite skin 34 in place during this transfer of the facesheet 12 and composite skin 34 to the tooling surface 24. However, pressure applied may be less than pressure applied to the impermeable membrane 32 during composite material cure, such that some material slippage and flexing is allowed as the layers of composite tape 16 are curved by the curvature of the tooling surface 24. The temporary bag may be removed once the facesheet 12 and the skin 34 are transferred to the tooling surface 24.

The method 700 may further include a step of electrically and/or physically contacting the facesheet 12 with the source of heat or electricity 30, as depicted in block 706. In some embodiments, the two bus bars 46,48 are electrically coupled to the conductive wires 44 and are clamped directly to the facesheet 12 at opposing ends of the facesheet 12. However, in other embodiments of the invention, portions of the facesheet 12 at or near opposing edges thereof are forced against the bus bars 46,48 during vacuum or autoclave pressure compressing the impermeable membrane 32 toward the tooling surface 24. In some embodiments, the bus bars 46,48 may comprise more than two bus bars or any other electrical coupling configuration without departing from the scope of the technology described herein. This step may further comprise threading the conductive wires 44 from one of the bus bars 46, through an air gap 50 of the single turn transformer 42, and to the other of the bus bars 48.

Next, in some embodiments, the method 700 may include a step of placing at least one substructure 36 onto the skin 34, as depicted in block 708, and placing the second insulating material 28 over the skin 34 and/or portions of the substructure 36, as depicted in lock 710. As noted above, the substructure 36 may be other composite components for attachment to the composite skin 34, such as frames and stringers for an inner mold line (IML) of an aircraft component. The substructure 36 may be pre-cured and placed onto the skin 34 for fusing thereto during cure of the skin 34. Furthermore, the substructure 36 may be tacked in place on the skin 34 to temporarily hold the substructure 36 in place prior to curing of the skin 34 and fusing of the substructure 36 thereto.

The second insulating material 28 may be an insulating sheet cut to allow the substructure 36 or substructures to protrude therethrough. The second insulating material 28 may further be used as a template for locating the substructure 36 or substructures at predetermined locations on the skin 34. For example, in some embodiments, the placement of the substructures 36 and the second insulating material 28 may be performed substantially simultaneously or in conjunction with each other to provide proper placement of substructures 36 like frames and stringers relative to the skin 34 while also covering the skin 34 with insulation so that the impermeable membrane 32 and most of the substructure 36 beyond the faying surface thereof is protected from heat coming from the facesheet 12. Thus, during cure, remelting, and/or fusing of the composite part, only the skin 34 and faying surfaces of the substructures 36 are exposed to full curing heat. This allows some portions of the substructures 36 to maintain their previously cured shapes and configurations, while still allowing the substructures 36 to fuse to the skin 34.

The method 700 may further include a step of placing the impermeable membrane 32 over the second insulating material 28, the substructure 36, and/or the skin 34, as depicted in block 712, and sealing the impermeable membrane 32 to the tooling surface 24, as depicted in block 714. Specifically, the impermeable membrane 32 may extend to portions of the tooling surface 24 that extend further outward than the second insulating material 28, as depicted in FIG. 5a. Likewise, the second insulating material 28 may be configured to extend further outward than the facesheet 12, such that the impermeable membrane 32 is protected from facesheet heat, as noted above. Any type of sealant tape, mud, or apparatus may be used to seal the impermeable membrane 32 to the tooling surface 24 without departing from the scope of the technology described herein.

Then the method 700 may include a step of compressing the skin 34 via applying a pressure differential that forces the impermeable membrane 32 toward the tooling surface 24, as depicted in block 716, then heating the facesheet 12 to a cure temperature, melting temperature, and/or fusing temperature via the source of heat or electricity 30 as depicted in block 718. In some embodiments, a vacuum port formed into and through the impermeable membrane 32 may be used to evacuate air or gas out from between the impermeable membrane 32 and the tooling surface 24 to compress the impermeable membrane 32 toward the tooling surface 24, thereby compressing the skin 34 and/or portions of the substructures 36. Additionally or alternatively, the tooling surface 24, first insulating material 36, skin 34, substructures 36, second insulating material 28, impermeable membrane 32, and at least portions of the source of heat or electricity 30 may be placed inside the autoclave 56 to thereby providing autoclave pressure to compress the impermeable membrane 32. For example, the impermeable membrane 32 may provide more than 15 PSI and up to approximately 215 PSI of pressure to the skin 34 of the composite part.

Note that the autoclave 56 is a cool autoclave, remaining well below cure, melting, or fusing temperatures throughout heating of the composite part or fusing of substructures to the composite part. For example, the autoclave 56 may remain at a temperature less than 100-degrees Fahrenheit, or less than 90-degrees Fahrenheit. More specifically, in one embodiment the autoclave 56 may remain at a temperature of approximately 85-degrees Fahrenheit throughout composite part cure using the methods herein. Additionally or alternatively, the autoclave 56 may remain well below melting temperatures and/or fusing temperatures of the composite part. This advantageously allows the use of low-temp vacuum bags or impermeable membranes with low temperature melting points and further saves on the amount of energy consumed to heat and/or cure the composite skin 34, since only the facesheet 12, the skin 34, and faying surfaces of the substructure 36 require heating. Furthermore, the tooling surface 24 does not suffer from thermal expansion since it is not heated, thus allowing for more accurate sizing of the resulting composite part.

In some embodiments, the tooling surface may even be actively cooled and/or fans may be added to assist in maintaining a uniform temperature in the autoclave 56 and preventing the tooling surface 24 from getting too hot and expanding an undesirable amount. Additionally, since only the faying surface of the substructures 36 are heated in this method 700, multiple complex tooling or mold components to provide sufficient pressure for maintaining shape and consolidation of the previously-formed substructures 36 are not needed, as they are not melted again during curing of the skin 34 due to the second insulating material 28.

Heating the facesheet 12 to the cure temperature, the melting temperature, and/or the fusing temperature may comprise applying joule heat via electric current through the facesheet 12. For example, the single turn transformer 42 may be turned on to receive electrical power from an external source and then transform the voltage output induced on the conductive wires 44, thereby increasing the amperage provided to the facesheet 12 through the conductive wires 44 and the bus bars 46,48. As described above, with the conductive wires 44 extending through the air gap 50, current is induced into the one or more conductive wires 44 when the single turn transformer 42 is turned on. This configuration advantageously allows large wires needed for providing high enough current for joule heating the skin 34 to cure temperature, melting temperature, or fusing temperature while requiring only a small opening in the autoclave 56 for receiving external electrical power (e.g., via the at least one source-coupling wire 52), thus making it easier and less expensive to maintain autoclave pressure during cure cycles using the method described herein.

Finally, the method 700 may include a step of cooling the facesheet 12 and skin 34, as depicted in block 720. In some embodiments, this step may be required after the composite part has hardened. Alternatively, in other embodiments, this cooling may be required to harden the skin 34 into the composite part. Once the skin 34, the substructure 36, or any other heated components of the present invention are cooled, the impermeable membrane 32 may be removed and the resulting composite part may be removed from the tooling surface 24 and the facesheet 12.

In some embodiments, alternatives may be used for one or more of the steps of method 700. For example, the tooling surface 24 and the source of heat or electricity 30 could be replaced with the heating elements and the exemplary tool or the platform described in U.S. patent application Ser. No. 16/404,794, filed on May 7, 2019 (hereinafter the '794 application), incorporated by reference herein in its entirety. Such alternatives are also described in PCT Application No. PCT/US20/31784, filed on May 7, 2020, which is likewise incorporated by reference herein in its entirety. Specifically, such an alternative may still include performing the steps described herein of ATL composite tape layup on a flat surface, but then may include alternatively transferring the faceplate 12 and the skin 34 to a curved-surface tool such as the exemplary tool in the '794 application, and then heating the skin 34 and the substructures 36 using the heating elements of the '794 application. This alternative embodiment may optionally also be performed without the first insulating layer 26 described herein. In some examples of this alternative embodiment, the facesheet 12 may be a breather or some other material that allows heat to flow therethrough to the skin 34, with or without being conductive. Other alternatives known in the art of composite material manufacture or aircraft component manufacturing may be used in place of various steps described herein without departing from the scope of the invention.

The present invention has been described in relation to particular examples, which are intended in all respects to be illustrative rather than restrictive. From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

Some aspects of this disclosure have been described with respect to the examples provided in the figures. Additional aspects of the disclosure will now be described that may be related subject matter included in one or more claims or clauses of this application at the time of filing, or one or more related applications, but the claims or clauses are not limited to only the subject matter described in the below portions of this description. These additional aspects may include features illustrated by the figures, features not illustrated by the figures, and any combination thereof. When describing these additional aspects, reference may be made to elements depicted by the figures for illustrative purposes.

As used herein and in connection with the claims listed hereinafter, the terminology "any of clauses" or similar variations of said terminology is intended to be interpreted such that features of claims/clauses may be combined in any combination. For example, an exemplary clause 4 may indicate the method/apparatus of any of clauses 1 through 3, which is intended to be interpreted such that features of clause 1 and clause 4 may be combined, elements of clause 2 and clause 4 may be combined, elements of clause 3 and 4 may be combined, elements of clauses 1, 2, and 4 may be combined, elements of clauses 2, 3, and 4 may be combined, elements of clauses 1, 2, 3, and 4 may be combined, and/or other variations.

The following clauses are aspects contemplated herein.

1. A method for manufacturing composite parts, the method comprising the steps of: placing a skin made of uncured composite material onto a facesheet lying flat on a flat surface; transferring the facesheet with the skin thereon onto a curved tooling surface; conforming the facesheet with the skin thereon to the curved tooling surface; and heating the skin to a cure temperature, a melting temperature, or a fusing temperature of the skin while the skin and the facesheet are conformed to the curved tooling surface.

2. The method of clause 1, wherein placing or forming the skin further comprises applying a plurality of courses of composite tape onto the facesheet using an automated tape layup (ATL) method while the facesheet is laid flat on a flat surface.

3. The method of clauses 1 or 2, further comprising compressing the skin during heating of the skin, wherein compressing the skin is performed by vacuum sealing an impermeable membrane toward the tooling surface and applying autoclave pressure within a cool autoclave, wherein the cool autoclave applies autoclave pressure at temperatures below the a cure temperature, a melting temperature, or a fusing temperature of the skin.

4. The method of any one of clauses 1-3, wherein the facesheet is made of a conductive material.

5. The method of any one of clauses 1-4, wherein the curved tooling surface is made of insulating material or a first insulating material is positioned between the tooling surface and the facesheet.

6. The method of any one of clauses 1-5, further comprising at least one of electrically and physically contacting the facesheet with a source of heat or electricity.

7. The method of clause 6, wherein the source of heat or electricity includes two bus bars at opposing ends of the facesheet and one or more conductive wires providing joule heating to the face sheet, wherein the one or more conductive wires extend from one of the bus bars to the other of the bus bars and are threaded through an air gap of a single turn transformer, such that heating the facesheet includes inducing current into the one or more conductive wires with the single turn transformer.

8. The method of any one of clauses 1-7, further comprising placing at least one substructure onto the skin prior to heating the skin.

9. The method of any one of clauses 1-8, further comprising placing a second insulating material over the skin, wherein the second insulating material is an insulating sheet cut to allow the at least one substructure to protrude therethrough, such that the second insulating material serves as a template for locating the substructure at a predetermined location on the skin.

10. The method of any one of clauses 1-9, further comprising compressing the skin during heating of the skin, wherein compressing the skin is performed by vacuum sealing an impermeable membrane toward the tooling surface and applying autoclave pressure within a cool autoclave, wherein the cool autoclave applies autoclave pressure at temperatures below the cure temperature, the melting temperature, or fusing temperature of the skin.

11. A method for manufacturing composite parts, the method comprising the steps of: forming a skin by placing a plurality of courses of composite tape onto a facesheet using an automated tape layup (ATL) method while the facesheet is laid flat on a flat surface; transferring the facesheet with the skin thereon from the flat surface to a tooling surface, wherein the tooling surface is curved and the facesheet with the skin thereon is curved by the tooling surface; compressing the skin via applying a pressure differential; heating the facesheet to a cure temperature, a melting temperature, or fusing temperature of the skin via a source of heat or electricity thereby heating the skin thereon.

12. The method of clause 11, wherein the facesheet is a flexible conductive sheet of material and wherein the tooling surface is made of insulating material or a first insulating material is positioned between the tooling surface and the facesheet such that the source of heat or electricity provides joule heat to the facesheet during the step of heating the facesheet.

13. The method of clause 11 or 12, placing at least one substructure onto the skin, wherein the substructure is made of composite material; and placing a second insulating material over the skin, wherein the second insulating material is an insulating sheet cut to allow the at least one substructure to protrude therethrough, such that the second insulating material serves as a template for locating the substructure at a predetermined location on the skin.

14. The method of any one of clauses 11-13, wherein the source of heat or electricity includes at least two bus bars at opposing ends of the facesheet and one or more conductive wires providing joule heating to the facesheet, wherein the facesheet is made of conductive material.

15. The method of clause 14, wherein the one or more conductive wires extend from one of the bus bars to the other of the bus bars and are threaded through an air gap of a single turn transformer, such that heating the facesheet includes inducing current into the one or more conductive wires with the single turn transformer.

16. The method of any one of clauses 11-15, wherein compressing the skin is performed by vacuum sealing an impermeable membrane toward the tooling surface and applying autoclave pressure within a cool autoclave, wherein the cool autoclave applies autoclave pressure at temperatures below the cure temperature, the melting temperature, or the fusing temperature of the skin.

17. The method of any one of clauses 11-16, further comprising applying magnets onto at least a portion of the plurality of courses of composite tape during ATL, thereby temporarily holding the plurality of courses of composite tape in place against the facesheet, and removing the magnets at a point in time between application of each layer of the plurality of courses of composite tape during ATL, wherein the facesheet is conductive.

18. A method for manufacturing thermoplastic composite parts, the method comprising the steps of forming a skin by placing a plurality of courses of composite tape onto a facesheet using an automated tape layup (ATL) method while the facesheet is laid flat on a flat surface, wherein the facesheet is a conductive sheet of material; transferring the facesheet with the skin thereon from the flat surface to a tooling surface, wherein the tooling surface has a simple curvature and the facesheet with the skin thereon is curved by the tooling surface, wherein the tooling surface is made of insulating material or a first insulating material is positioned between the tooling surface and the facesheet; electrically and/or physically contacting the facesheet with a source of joule heat; placing a plurality of substructures onto the skin, wherein the substructures include at least one of composite frames and composite stringers; placing a second insulating material over the skin; placing an impermeable membrane over the second insulating material, the substructure, and the skin; sealing the impermeable membrane to the tooling surface; placing the tooling surface, the skin, the plurality of substructures, the facesheet, the first insulating material, the second insulating material, the impermeable membrane, and the joule heating source into a cool autoclave, wherein the cool autoclave applies autoclave pressure at temperatures below a cure temperature, a melting temperature, or a fusing temperature of the skin; compressing the skin via applying a pressure differential that forces the impermeable membrane toward the tooling surface using at least one of vacuum and autoclave pressure from the cooling autoclave; and heating the facesheet to the cure temperature, the melting temperature, or the fusing temperature of the skin via the source of joule heat, wherein the source of joule heat is a single turn transformer, wherein a plurality of conductive wires extending from one end of the skin to an opposite end of the skin are threaded through an air gap of the single turn transformer, such that heating the facesheet includes inducing current into the plurality of conductive wires with the single turn transformer.

19. The method of clause 18, wherein the second insulating material is an insulating sheet cut to allow the plurality of substructures to protrude therethrough, such that the second insulating material serves as a template for locating the plurality of substructures at predetermined locations relative to each other on the skin.

20. The method of clause 18 or 19, further comprising applying magnets onto at least a portion of the plurality of courses of composite tape during ATL, thereby temporarily holding the plurality of courses of composite tape against the facesheet, and removing the magnets at a point in time between application of each layer of the plurality of courses of composite tape during ATL.

21. A system for forming and curing a composite part, the system comprising: a facesheet made of a conductive material for placement of the composite part thereon; a tooling surface, wherein the tooling surface is made of insulating material or a first insulating material is positioned onto the tooling surface, wherein the facesheet is positioned on at least one of the tooling surface and the first insulating material, wherein at least a portion of the tooling surface is not flat; and a source of heat or electricity at least one of physically and electrically coupled to the facesheet, wherein the source of heat or electricity generates sufficient heat to cure, melt, or fuse the composite part.

22. The system of clause 21, further comprising an impermeable membrane for placement over the composite part, wherein the impermeable membrane is sealed to the tooling surface and applies consolidation pressure to the composite part when a pressure differential is applied to the impermeable membrane forcing the impermeable membrane toward the tooling surface.

23. The system of clause 21 or 22, wherein the tooling surface is curved and the facesheet is curved by the tooling surface.

24. The system any one of clauses 21-23, further comprising a second insulating material for placement over the composite part, wherein the second insulating material is an insulating sheet cut to allow at least one substructure of the composite part to protrude therethrough, such that the second insulating material serves as a template for locating the substructure at a predetermined location on a skin of the composite part.

25. The system of any one of clauses 21-24, wherein the source of heat or electricity includes two bus bars at opposing ends of the facesheet and one or more conductive wires providing joule heating to the face sheet.

26. The system of clause 25, wherein the source of heat or electricity further comprises a single turn transformer, wherein the one or more conductive wires extend from one of the bus bars to another one of the bus bars and are threaded through an air gap of the single turn transformer such that heating the facesheet includes inducing current into the one or more conductive wires with the single turn transformer.

27. The system of any one of clauses 21-26, wherein the facesheet is made of steel.

28. The system of any one of clauses 21-27, further comprising an automated tape layup (ATL) machine for laying courses of composite material onto the facesheet on a flat surface prior to insertion of the facesheet onto the tooling surface.

29. The system of clause 28, further comprising a magnet-placement apparatus operable to lay down and pick up magnets by effectuating a change in polarity, wherein the magnet-placement apparatus is configured to place magnets onto a first layer of courses of composite material during layup by the ATL machine and to pick up magnets from the courses of composite material prior to the ATL machine placing a second layer of courses of composite material.

30. A system for forming and curing a composite part, the system comprising: a facesheet made of a conductive sheet of material for placement of the composite part thereon; a tooling surface, wherein the tooling surface is made of insulating material or a first insulating material is positioned onto the tooling surface, wherein the facesheet is positioned on at least one of the tooling surface and the first insulating material, wherein the tooling surface has a simple curvature; a second insulating material for placement over the composite part; and a source of joule heat at least one of physically and electrically coupled to the facesheet, wherein the source of joule heat generates sufficient heat to cure, melt, or fuse the composite part.

31. The system of clause 30, further comprising an impermeable membrane for placement over the second insulating material and the composite part, wherein the impermeable membrane is sealed to the tooling surface and applies consolidation pressure to the composite part when a pressure differential is applied to the impermeable membrane forcing the impermeable membrane toward the tooling surface.

32. The system of clause 30 or 31, wherein the second insulating material is an insulating sheet cut to allow at least one substructure of the composite part to protrude therethrough, such that the second insulating material serves as a template for locating the substructure at a predetermined location on a skin of the composite part.

33. The system of any one of clauses 30-32, wherein the source of joule heat includes a single turn transformer, two bus bars made of copper at opposing ends of the facesheet, and one or more conductive wires, wherein the one or more conductive wires extend from one of the bus bars to another one of the bus bars and are threaded through an air gap of the single turn transformer such that heating the facesheet includes inducing current into the one or more conductive wires with the single turn transformer.

34. The system of any one of clauses 30-33, further comprising an automated tape layup (ATL) machine for laying courses of composite material onto the facesheet on a flat surface prior to insertion of the facesheet onto the tooling surface.

35. The system of clause 34, further comprising a magnet-placement apparatus operable to lay down and pick up magnets by effectuating a change in polarity, wherein the magnet-placement apparatus is configured to place magnets onto a first layer of courses of composite material during layup by the ATL machine and to pick up magnets from the courses of composite material prior to the ATL machine placing a second layer of courses of composite material.

36. A system for forming and curing a thermoplastic composite part, the system comprising: a facesheet made of a conductive sheet of material for placement of the thermoplastic composite part thereon; a tooling surface, wherein the tooling surface is made of insulating material or a first insulating material is positioned onto the tooling surface, wherein the facesheet is positioned on at least one of the tooling surface and the first insulating material, wherein the tooling surface has a simple curvature; a second insulating material for placement over the thermoplastic composite part; an impermeable membrane placed over the second insulating material and the thermoplastic composite part, wherein the impermeable membrane is sealed to the tooling surface and is configured to apply consolidation pressure to the thermoplastic composite part when a pressure differential is applied to the impermeable membrane forcing the impermeable membrane toward the tooling surface; and a source of joule heat at least one of physically and electrically coupled to the facesheet, wherein the source of joule heat generates sufficient heat to cure, melt, or fuse the thermoplastic composite part, wherein the source of joule heat includes at least two conductive bus bars attached to opposing ends of the facesheet, and one or more conductive wires providing current to heat the facesheet.

37. The system of clause 36, wherein the second insulating material is an insulating sheet cut to allow a plurality of frames and stringers of the thermoplastic composite part to protrude therethrough, such that the second insulating material serves as a template for locating the frames and stringers at a predetermined location on a skin of the thermoplastic composite part.

38. The system of clause 36 or 37, wherein the source of joule heat further includes a single turn transformer, wherein the at least two bus bars are made of copper, wherein the one or more conductive wires extend from one of the bus bars to another one of the bus bars and are threaded through an air gap of the single turn transformer such that heating the facesheet includes inducing current into the one or more conductive wires with the single turn transformer.

39. The system of any one of clauses 36-38, further comprising an automated tape layup (ATL) machine for laying courses of composite material onto the facesheet on a flat surface prior to insertion of the facesheet onto the tooling surface.

40. The system of clause 39, further comprising a magnet-placement apparatus operable to lay down and pick up magnets by effectuating a change in polarity, wherein the magnet-placement apparatus is configured to place magnets onto a first layer of courses of composite material during layup by the ATL machine and to pick up magnets from the courses of composite material prior to the ATL machine placing a second layer of courses of composite material.

The following claims are presented with single dependencies to comply with U.S. practice. However, unless the features of the claims are incompatible, it is envisaged that any claim may be dependent upon any one, or any combination, of the preceding claims.

The invention claimed is:

1. A system for forming a composite part, the system comprising:
   a facesheet made of a conductive material for placement of the composite part thereon;
   a tooling surface;
   a first insulating material positioned onto the tooling surface, wherein the facesheet is positioned on the first insulating material, wherein at least a portion of the tooling surface is not flat; and
   a source of heat or electricity at least one of physically and electrically coupled to the facesheet,
   wherein the source of heat or electricity includes two bus bars at opposing ends of the facesheet and one or more conductive wires providing joule heating to the face sheet,
   wherein the source of heat or electricity further comprises a single turn transformer, wherein the one or more conductive wires extend from one of the bus bars to another one of the bus bars and are threaded through an air gap of the single turn transformer such that heating the facesheet includes inducing current into the one or more conductive wires with the single turn transformer.

2. The system of claim 1, further comprising an impermeable membrane for placement over the composite part, wherein the impermeable membrane is sealed to the tooling surface and applies consolidation pressure to the composite part when a pressure differential is applied to the impermeable membrane forcing the impermeable membrane toward the tooling surface.

3. The system of claim 1, wherein the tooling surface is curved and the facesheet is curved by the tooling surface.

4. The system of claim 1, further comprising a second insulating material for placement over the composite part, wherein the second insulating material is an insulating sheet cut to allow at least one substructure of the composite part to protrude therethrough, such that the second insulating material serves as a template for locating the substructure at a predetermined location on a skin of the composite part.

5. The system of claim 1, wherein the facesheet is made of steel.

6. The system of claim 1, further comprising an automated tape layup (ATL) machine for laying strips of composite material onto the facesheet on a flat surface prior to insertion of the facesheet onto the tooling surface.

7. The system of claim 6, further comprising a magnet-placement apparatus operable to lay down and pick up magnets by effectuating a change in polarity, wherein the magnet-placement apparatus is configured to place magnets onto a first layer of strips of composite material during layup by the ATL machine and to pick up magnets from the strips of composite material prior to the ATL machine placing a second layer of strips of composite material.

8. A system for forming and curing a composite part, the system comprising:
- a facesheet made of a conductive sheet of material for placement of the composite part thereon, the facesheet having opposing ends;
- a tooling surface, wherein the tooling surface is made of insulating material or a first insulating material is positioned onto the tooling surface, wherein the facesheet is positioned on at least one of the tooling surface and the first insulating material, wherein the tooling surface has a simple curvature;
- a second insulating material for placement over the composite part; and
- a source of joule heat at least one of physically and electrically coupled to the facesheet,
- wherein the source of joule heat is electrically coupled with the opposing ends of the facesheet to provide joule heating to the facesheet,
- wherein the source of joule heat comprises a single turn transformer and one or more conductive wires extending from one of the opposing ends of the facesheet to another one of the opposing ends of the facesheet, wherein the one or more conductive wires are threaded through an air gap of the single turn transformer such that inducing current into the one or more conductive wires with the single turn transformer heats the facesheet.

9. The system of claim 8, further comprising an impermeable membrane for placement over the second insulating material and the composite part, wherein the impermeable membrane is sealed to the tooling surface and applies consolidation pressure to the composite part when a pressure differential is applied to the impermeable membrane forcing the impermeable membrane toward the tooling surface.

10. The system of claim 8, wherein the second insulating material is an insulating sheet cut to allow at least one substructure of the composite part to protrude therethrough, such that the second insulating material serves as a template for locating the substructure at a predetermined location on a skin of the composite part.

11. The system of claim 8, further comprising an automated tape layup (ATL) machine for laying strips of composite material onto the facesheet on a flat surface prior to insertion of the facesheet onto the tooling surface.

12. The system of claim 11, further comprising a magnet-placement apparatus operable to lay down and pick up magnets by effectuating a change in polarity, wherein the magnet-placement apparatus is configured to place magnets onto a first layer of strips of composite material during layup by the ATL machine and to pick up magnets from the strips of composite material prior to the ATL machine placing a second layer of strips of composite material.

13. A system for forming and curing a thermoplastic composite part, the system comprising:
- a facesheet made of a conductive sheet of material for placement of the thermoplastic composite part thereon;
- an automated tape layup (ATL) machine for laying strips of composite material onto the facesheet on a flat surface;
- a magnet-placement apparatus operable to lay down and pick up magnets by effectuating a change in polarity, wherein the magnet-placement apparatus is configured to place magnets onto a first layer of the strips of composite material during layup by the ATL machine and to pick up magnets from the first layer of the strips of composite material prior to the ATL machine placing a second layer of the strips of composite material;
- a tooling surface, wherein the tooling surface is made of insulating material or a first insulating material is positioned onto the tooling surface, wherein the facesheet is transferable from the flat surface onto the at least one of the tooling surface and the first insulating material, wherein the tooling surface has a simple curvature to which the facesheet is conformable upon transfer from the flat surface;
- a second insulating material for placement over the strips of composite material when the facesheet is on the at least one of the tooling surface and the first insulating material;
- an impermeable membrane placed over the second insulating material and the thermoplastic composite part, wherein the impermeable membrane is sealed to the tooling surface and is configured to apply consolidation pressure to the thermoplastic composite part when a pressure differential is applied to the impermeable membrane forcing the impermeable membrane toward the tooling surface; and
- a source of joule heat at least one of physically and electrically coupled to the facesheet, wherein the source of joule heat includes at least two conductive bus bars attached to opposing ends of the facesheet, and one or more conductive wires providing current to heat the facesheet.

14. The system of claim 13, wherein the second insulating material is an insulating sheet cut to allow a plurality of frames and stringers of the thermoplastic composite part to protrude therethrough, such that the second insulating material serves as a template for locating the frames and stringers at a predetermined location on a skin of the thermoplastic composite part.

15. The system of claim 13, wherein the source of joule heat further includes a single turn transformer, wherein the at least two bus bars are made of copper, wherein the one or more conductive wires extend from one of the bus bars to another one of the bus bars and are threaded through an air gap of the single turn transformer such that heating the facesheet includes inducing current into the one or more conductive wires with the single turn transformer.

* * * * *